Aug. 14, 1956
L. M. ROBERTS
2,758,535
ELECTRICAL PRECIPITATION APPARATUS
Filed June 26, 1952
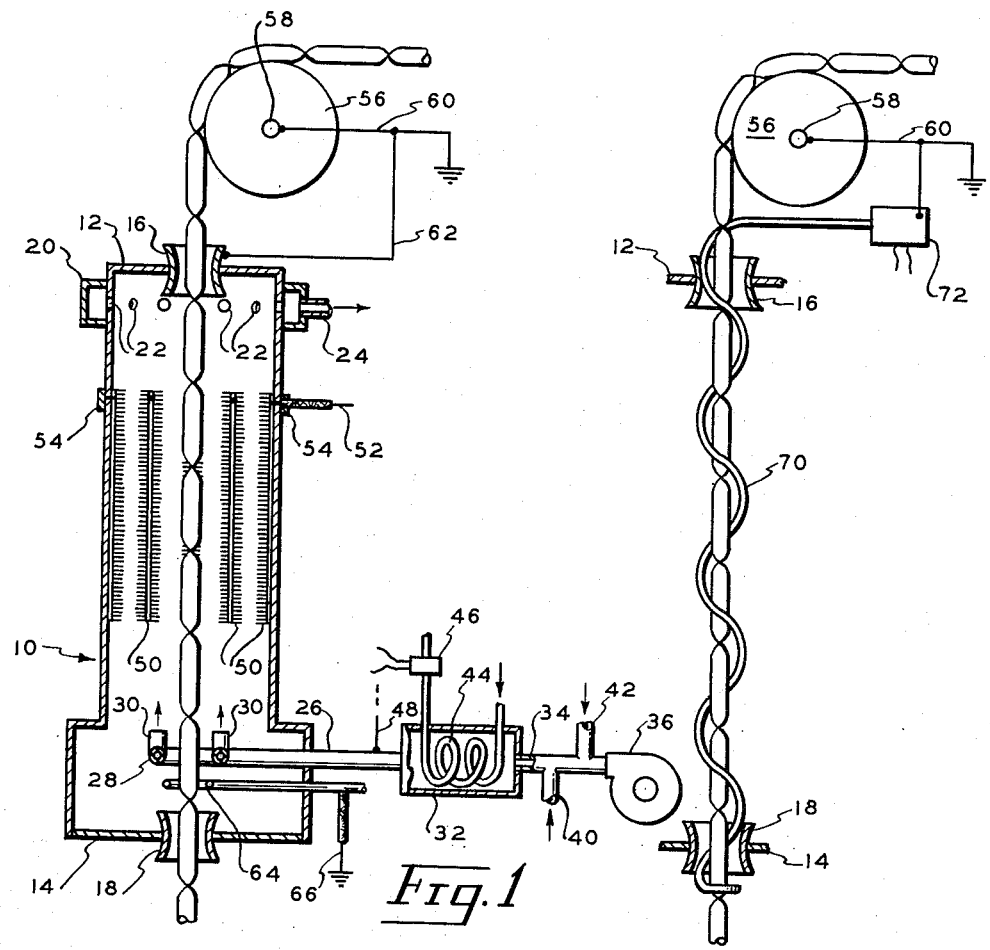
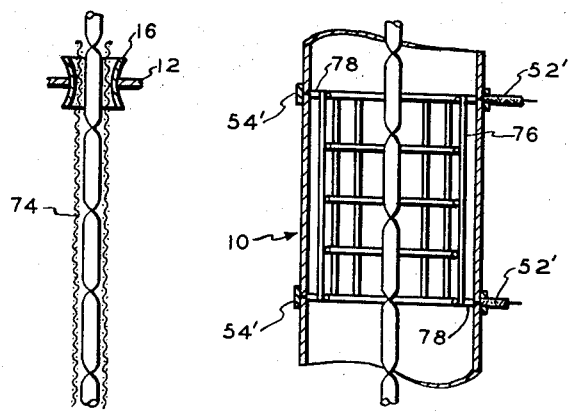
*INVENTOR*
LAURENCE M. ROBERTS
BY Harold T. Stowell
*ATTORNEY*

United States Patent Office 2,758,535
Patented Aug. 14, 1956

2,758,535

ELECTRICAL PRECIPITATION APPARATUS

Lawrence M. Roberts, Bound Brook, N. J., assignor to Research Corporation, New York, N. Y., a corporation of New York Application June 26, 1952, Serial No. 295,800

1 Claim. (Cl. 99—261)

This invention relates to electrical precipitation apparatus and method and more particularly to an improved apparatus and method for treating food products with products of combustion, such as wood smoke, within an electrostatic field whereby the food is given both a flavoring and a preservative treatment.

It is a principal object of the invention to provide a method and apparatus for passing a continuous flow of food products, such as linked sausages, through a confined space wherein smoke is electrostatically precipitated on the food in a substantially uniform layer.

A further object is to provide such a method and apparatus wherein the treating zone is provided with corona discharge elements operated on the high voltage side of the electrical circuit and the food to be treated forms the receiving or collecting electrode of the electrical precipitation circuit.

Another object is to provide such a method and apparatus including means for introducing products of combustion, such as wood smoke, into the treating zone and further means for introducing smoke conditioning vapors, such as steam, into the treating zone to provide for efficient and uniform treatment of the food.

A further object is to provide for temperature control of the food treating substances whereby the substances will be suspended in the carrier gas stream as discrete particles rather than in the gaseous form.

A further object of the invention is to provide a method and apparatus for treating foods that is substantially simple as to its parts, inexpensive to manufacture, and efficient in operation.

These and other objects and advantages are provided by the apparatus for electrostatically treating continuous strings of food products, which generally comprises an extended surface discharge electrode, means for conveying an unsupported string of food products adjacent the extended surface discharge electrode, means for establishing a high tension electrostatic field between the food products and the discharge electrode, means for introducing a flow of gas into the electrostatic field and means for suspending food treating substances in said gas flow, whereby said food treating substances are electrostatically deposited upon the string of food products; and by the method of the invention which generally comprises the steps (1) passing through a gas treating zone provided with extended surface discharge electrodes a string of food products unsupported within the chamber; (2) establishing a high tension electrostatic field between the discharge electrodes and the string of food products; (3) establishing a flow of gas through the treating zone; and (4) suspending food treating substances in the gas whereby the food treating substances are electrostatically deposited upon the string of food products.

The invention will be more particularly described with reference to a method and apparatus for treating linked sausages with reference to the illustrative embodiment shown in the accompanying drawings in which:

Fig. 1 is a sectional diagrammatic view in elevation of one form of the food treating apparatus constructed in accordance with the principles of the invention;

Fig. 2 is a fragmentary diagrammatic view in elevation of a guide for the food products to be treated;

Fig. 3 is a fragmentary view of another form of guide member for the products to be treated;

Fig. 4 is a fragmentary view in elevation of still another form of the discharge electrode of the invention.

In the specification and claims of the invention the word "smoke" is used to designate treated or untreated products of combustion and/or distillation from the burning and/or charring of wood and/or other ligno-cellulosic products which are particularly adapted for flavoring and preserving food products.

With reference to the drawings and in particular to Fig. 1, 10 is the shell or casing of the food treating device which is preferably constructed of insulating material and is preferably circular in cross-section whereby the electrostatic characteristics of the food treating device are substantially improved, as to be more fully described hereinafter. The casing is provided with a top 12 and bottom 14, each of which are provided with an annular opening centrally positioned therein. Within the annular openings are similar guide members 16 and 18 through which the food products to be treated pass.

Adjacent the top 12 is a collector ring 20 which communicates through a plurality of orifices 22 with the interior of the treating zone. The collector ring is connected to a suitable exhaust fan, not shown in the drawings, by a conduit 24.

Adjacent the bottom of the casing a conduit 26 enters the casing, and is provided with an annular discharge ring 28 having a plurality of vertically positioned discharge tips 30. The annular ring, as is clearly shown in the drawings, is concentric with the upper and lower food guide members 16 and 18, whereby the string of food products passes through the center of the discharge ring.

The other end of conduit 26 is connected to a conditioning and mixing chamber 32 wherein, for example, air, smoke, and steam are fed to provide the proper food conditioning ingredients.

The chamber 32 has a gaseous product inlet conduit 34 which is connected to a suitable fan or blower 36. Between the blower and the mixing chamber, inlets for products of combustion and steam and/or other flavoring and food conditioning substances are provided. Two such inlets are shown at 40 and 42.

A coil 44 is positioned within the mixing chamber for circulating a cooling or heating medium whereby the temperature of the food treating substances may be controlled prior to their entry into the food treating zone. The coil 44 may be provided with any well known electromagnetic valve, shown diagrammatically at 46, for controlling the flow through the coil. The valve 46 may advantageously be interconnected with a thermostat 48 positioned in conduit 26.

Between the food treating gas inlet 28 of the precipitation chamber and the gas outlets 22 is the precipitation zone which, as shown in Fig. 1, comprises a plurality of vertically extending discharge electrodes 50 equally spaced about the inner peripheral surface of the casing 10. The vertically extending discharge electrodes 50 are studded with fine wire points to increase corona discharge therefrom and to improve the efficiency of the unit.

The discharge electrodes 50 are connected to the high voltage lead in 52 through a busbar 54. The other end of high tension lead-in is connected to a suitable source of high voltage current.

Positioned above the top of the casing is the feeding mechanism for the food stuff to be treated. As shown in the drawings, the feeding mechanism comprises a grooved wheel 56 which is preferably constructed of a conductive material. The wheel 56 is secured to a shaft 58 which may be driven by a motor through conventional gearing not shown in the drawing. The food products to be treated, as shown in the drawings, comprise a string of which, as shown in the drawings, comprise a string of linked sausages, pass over the wheel 56 and as the wheel is rotated the sausages are fed into the guide 16 and co-axially through the precipitation zone.

A ground terminal 60 of the high voltage supply is connected to the conductive wheel which grounds the linked sausages to form the receiving or collecting electrode of the electrical precipitation circuit. A grounded lead 62 may also be connected to the upper guide member 16.

On installations wherein the wheel 56 is not constructed of a conductive material the string of food products may be connected to the ground terminal of the high voltage supply through conductive brushes and the like.

To aid in keeping the string of sausages positioned centrally of the treating zone a guide ring 64 may be provided at the lower end of the treating zone. This guide may either be of conductive material as shown in the drawings, in which case it is preferred to ground the guide member by a ground terminal such as shown at 66, or the guide member may be of insulating material.

In operation the electrical system of the treating zone is energized and the particular food treating substances and conditioners are forced into the mixing chamber 32 by an air stream from blower 36. The temperature of the mixture is regulated by means of the thermostat 48 and valve 46 in the circuit of coil 44.

When the desired flow of treating material is obtained a string of food stuffs such as sausages is fed over the grooved wheel 56 and through the precipitating chamber. As the string of sausages passes co-axially past the discharge electrodes 50, the food treating substances carried in the air stream which issues from nozzles 30 are precipitated substantially uniformly upon the surface of the sausages. The air stream which has been substantially freed of suspended food treating substances is removed from the top of the casing 10 by the collector ring 20.

It will be seen that as the sausages pass co-axially through the circular treating zone the plurality of corona discharge points, all of which are substantially equidistant from the food product, aid in insuring that a highly uniform layer of treating material is precipitated upon the surface of the sausages, with substantially no loss of food treating substances. The above referred to uniformity of the precipitated layer and the substantially complete useful utilization of the suspended food treating products is in part achieved in the present invention by making the food product to be treated the collecting electrode of the electrostatic precipitator circuit.

In Fig. 2 of the drawings there is shown a modified food stuff guide for the food treating device shown in Fig. 1 of the drawings. Like parts in Figs. 1 and 2 are provided with the same reference numerals. In Fig. 2 the food stuff to be treated is guided throughout the entire length of the food treating chamber by a spirally wound guide element 70. The guide element may be constructed either of conductive or non-conductive material. One end of the novel guide element 70 is preferably connected to a vibrator shown diagrammatically at 72. The vibrator jars the guide element 70 which aids in keeping the string of food products moving smoothly through the precipitation chamber. Jarring of the guide element also loosens any accumulations of precipitated food treating substances which have deposited upon its surface and transfers them, by electrical precipitation action, to the food product. On installations where the spirally wound guide element 70 is constructed of conductive material it has been found to be advantageous to connect the guide element to the ground terminal of the electrical circuit.

In Fig. 3 of the drawings a modified form of food guide is shown in the form of a perforated tubular member 74. This guide member 74 may be constructed of open mesh screen and is preferably attached to a vibrator as shown and described with reference to Fig. 2 of the drawings.

In Fig. 4 of the drawings a modified form of the tubular discharge electrode is shown, which generally comprises a cage 76 of conductive material supported from the walls of the tubular casing by circular support elements 78. The casing 10 as disclosed with reference to Fig. 1 of the drawings may be constructed of conductive or insulating material. The cage type discharge electrode 76 is connected to the high voltage lead in 52' through busbars 54' which encircle the outer surface of the casing 10.

From the foregoing description it will be seen that the present invention provides an improved electrostatic food treating apparatus and method of treating foods whereby the aims, objects, and advantages of the invention are fully accomplished.

It will be evident that various modifications may be made in the construction of the device and in the form of the apparatus without departing from the scope of the invention. For example, the discharge electrodes supported by the food stuff treating chamber may be in other forms than shown in Figs. 1 and 2 of the drawings, and a discharge electrode wire having corona discharge points projecting therefrom has given very satisfactory results and even precipitation of the food treating products when it is specially wound on the interior surface of the casing.

I claim:

An apparatus for electrostatically treating food products comprising, an elongated cylindrical treating chamber constructed of electrical insulating material, a plurality of spaced conductive high tension corona forming discharge electrode members secured about the inner cylindrical surface of the treating chambers to provide a substantially cylindrical corona discharge zone throughout the elongated treating chamber, means for conveying food products to be treated co-axially through said cylindrical treating chamber, conductor means connecting the corona discharge forming electrodes to one terminal of a source of high potential current, conductor means connecting the conveyor means for the food products to be treated to the other terminal of the source of high potential current, means for introducing a flow of gas through said treating chamber, means for introducing smoke products into the gas flow through said food treating chamber whereby the smoke products are electrostatically charged and precipitated out of the flow of gas and deposited uniformly upon the food product passing through the treating chamber when the discharge electrodes are energized.

References Cited in the file of this patent

UNITED STATES PATENTS

| 1,402,203 | Alsop | Jan. 3, 1922 |
| 1,483,668 | Little | Feb. 12, 1924 |
| 1,710,747 | Smith | Apr. 30, 1929 |
| 1,960,516 | Taylor | May 29, 1934 |
| 2,047,525 | Thode | July 14, 1936 |
| 2,247,963 | Ransburg et al. | July 1, 1941 |
| 2,565,454 | MacKenzie et al. | Aug. 21, 1951 |
| 2,576,319 | Toulmin et al. | Nov. 27, 1951 |
| 2,585,799 | Lawrence | Feb. 12, 1952 |
| 2,589,034 | Beedy | Mar. 11, 1952 |
| 2,604,870 | Blood et al. | July 29, 1952 |

FOREIGN PATENTS

| 594,564 | Great Britain | Nov. 13, 1947 |
| 479,254 | Canada | Dec. 11, 1951 |